US012680007B2

(12) United States Patent
Tarr

(10) Patent No.: US 12,680,007 B2
(45) Date of Patent: Jul. 14, 2026

(54) BOWLS AND ATTACHMENTS FOR FOOD PROCESSING APPARATUSES

(71) Applicant: Haier US Appliance Solutions, Inc., Wilmington, DE (US)

(72) Inventor: Ronald Scott Tarr, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 989 days.

(21) Appl. No.: 17/839,917

(22) Filed: Jun. 14, 2022

(65) Prior Publication Data
US 2023/0399557 A1     Dec. 14, 2023

(51) Int. Cl.
*C09K 5/06*          (2006.01)
*A47J 43/07*         (2006.01)
*C09K 5/04*          (2006.01)

(52) U.S. Cl.
CPC ............. *C09K 5/06* (2013.01); *A47J 43/0727* (2013.01); *C09K 5/04* (2013.01)

(58) Field of Classification Search
CPC ........ A47J 43/0727; C09K 5/06; B01F 35/50; B01F 35/51
See application file for complete search history.

(56) References Cited

U.S. PATENT DOCUMENTS

| | | | | |
|---|---|---|---|---|
| 3,237,924 | A * | 3/1966 | Soper | A47J 43/044 |
| | | | | 366/276 |
| 4,887,909 | A | 12/1989 | Bennett | |
| 6,574,971 | B2 * | 6/2003 | Suppes | C09K 5/063 |
| | | | | 252/70 |
| 2006/0018187 | A1 | 1/2006 | Donna et al. | |
| 2006/0191283 | A1 * | 8/2006 | Overgaard | F25D 31/007 |
| | | | | 222/566 |
| 2008/0087674 | A1 * | 4/2008 | Overgaard | C09K 5/063 |
| | | | | 220/592.16 |
| 2013/0266705 | A1 * | 10/2013 | Sundberg | A23B 2/30 |
| | | | | 165/104.17 |
| 2014/0290285 | A1 * | 10/2014 | Formato | C08K 5/01 |
| | | | | 165/185 |
| 2019/0174945 | A1 * | 6/2019 | Oti | A47J 27/004 |
| 2020/0009520 | A1 | 1/2020 | Kellenberger et al. | |
| 2020/0245638 | A1 | 8/2020 | Crema et al. | |
| 2021/0392918 | A1 * | 12/2021 | Anand | A47J 43/044 |

FOREIGN PATENT DOCUMENTS

| | | |
|---|---|---|
| CN | 111296514 A | 6/2020 |
| EP | 2997865 A2 | 3/2016 |

* cited by examiner

*Primary Examiner* — Marc C Howell
(74) *Attorney, Agent, or Firm* — Dority & Manning, P.A.

(57)          ABSTRACT
An accessory for a food processing apparatus includes a wall having an inner and outer surface. An enclosed space is defined by the inner surface of the wall. A phase change material fills at least a portion of the enclosed space and is in thermal communication with at least a portion of the inner surface the wall. The phase change material changes phases at a predetermined temperature.

11 Claims, 10 Drawing Sheets

200

270

210

220

290

BOWLS AND ATTACHMENTS FOR FOOD PROCESSING APPARATUSES

FIELD OF THE INVENTION

The present disclosure relates generally to bowls and attachments for food processing apparatuses, such as stand mixers.

BACKGROUND OF THE INVENTION

Food processing apparatuses generally include a container for containing the food to be processed and one or more attachments for processing the food, e.g., kneading, mixing, blending, and the like. For some foods and some food processing, maintaining the temperature at a desired level during processing may be important. For certain foods, it is important to avoid unnecessarily heating the food, e.g., for frozen foods and yeast. However, the food processing operation can heat the ingredients being processed. For other foods, it is important to maintain an elevated temperature, e.g., when using melted butter. A room temperature container or attachment can cool hot ingredients. Thus, the very operation of the food processing apparatus may adversely effect the food processing operation.

BRIEF DESCRIPTION OF THE INVENTION

The present subject matter provides attachments and containers for food processing apparatuses having one or more walls defining an enclosed space. The attachments and containers include a phase change material enclosed in the enclosed space and in thermal communication with one surface of at least a portion of the one or more walls. The opposing surface of the portion of the one or more walls in thermal communication with phase change material is in contact with the food while it is being processed. The phase change material may be charged to a predetermined temperature and will maintain that temperature while absorbing heat from or providing heat to the food being processed. Aspects and advantages of the invention will be set forth in part in the following description, may be apparent from the description, or may be learned through practice of the invention.

In one example aspect, an accessory for a food processing apparatus is disclosed. The accessory includes a wall having an inner and outer surface. An enclosed space is defined by the inner surface of the wall. A phase change material fills at least a portion of the enclosed space and is in thermal communication with at least a portion of the inner surface the wall. The phase change material changes phases at a predetermined temperature.

In another example aspect, a method of maintaining a predetermined temperature of a food being manipulated by a food processing apparatus while in use is disclosed. The method includes providing an accessory for a food processing apparatus. The accessory includes a wall having an inner and outer surface, an enclosed space defined by the inner surface of the wall, and a phase change material filling at least a portion of the enclosed space and in thermal communication with at least a portion of the inner surface the wall. The method further including bringing the food into contact with at least a portion of the outer surface of the wall adjacent to the portion of the inner surface of the wall in thermal contact with the phase change material while being manipulated by the food processing apparatus.

In a further example aspect, a container for use with a food processing apparatus is disclosed. The container includes an inner wall having a first and a second opposing surfaces and an outer wall having a first and a second opposing surfaces. An enclosed space is at least partially defined by the inner wall and the outer wall. A phase change material fills at least a portion of the enclosed space adjacent to the first surfaces of the inner and outer wall and is in thermal communication with at least a portion of the first surface of inner wall. An insulating material fills at least a portion of the enclosed space and is in thermal communication with at least a portion of the first surface of outer wall. The phase change material changes phases at a predetermined temperature.

In yet another example aspect, a method of maintaining a predetermined temperature of a food being manipulated by a food processing apparatus while in use is disclosed. The method includes providing a container for use with a food processing apparatus. The container includes an inner wall having a first and a second opposing surfaces and an outer wall having a first and a second opposing surfaces, an enclosed space at least partially defined by the inner wall and the outer wall, and adjacent to the first surfaces of the inner and outer wall, a phase change material filling at least a portion of the enclosed space and in thermal communication with at least a portion of the first surface of inner wall, and an insulating material filling at least a portion of the enclosed space and in thermal communication with at least a portion of the first surface of outer wall. The method further includes bringing the food into contact with at least a portion of the second surface of the inner wall adjacent to the portion of the first surface of the inner wall in thermal contact with the phase change material while being manipulated by the food processing apparatus.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION OF THE INVENTION

Figure 1:
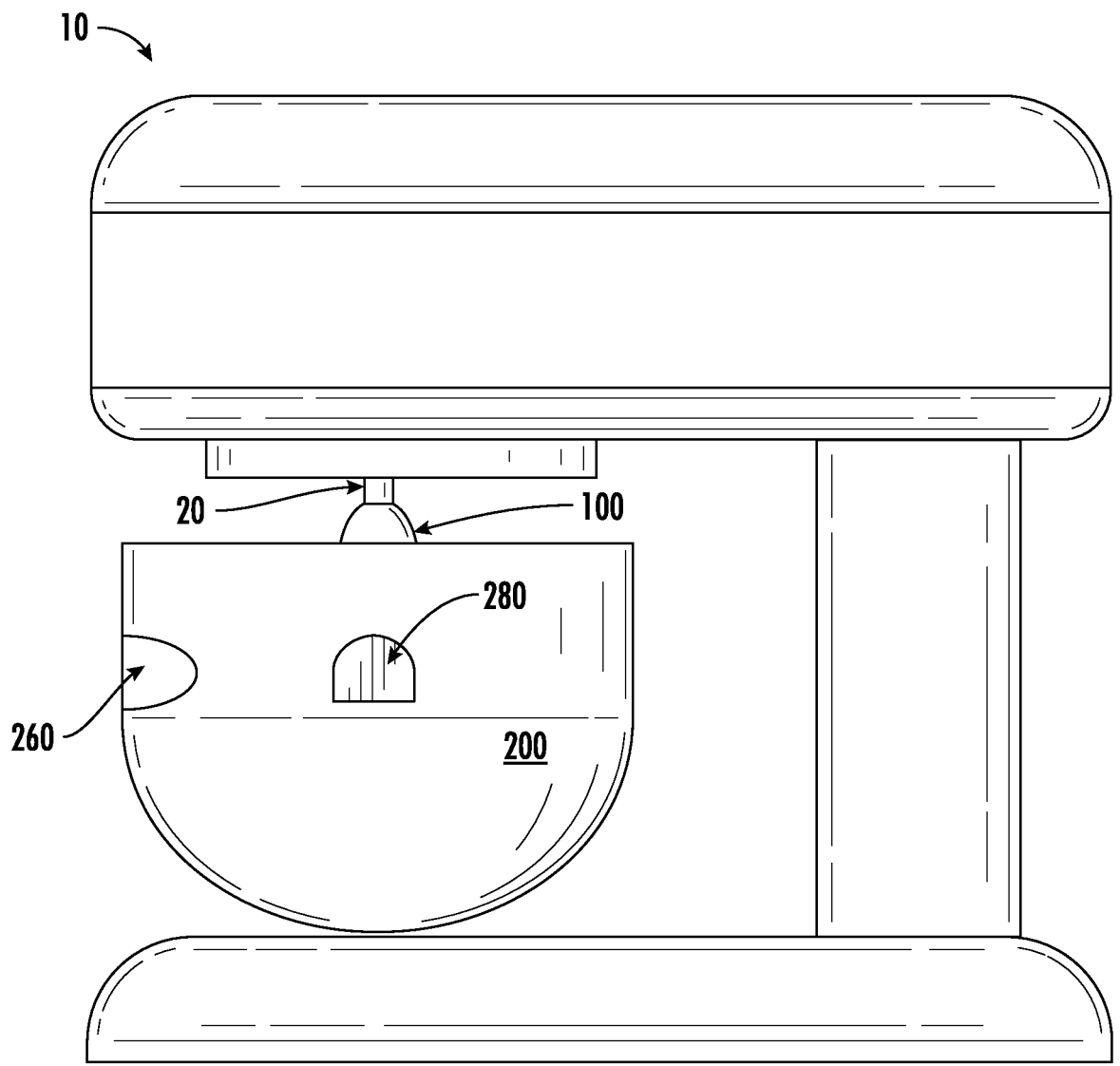
FIG. 1 is a side, elevation view of a stand mixer employing an attachment and a container according to an example embodiment of the present subject matter.
Figure 2:
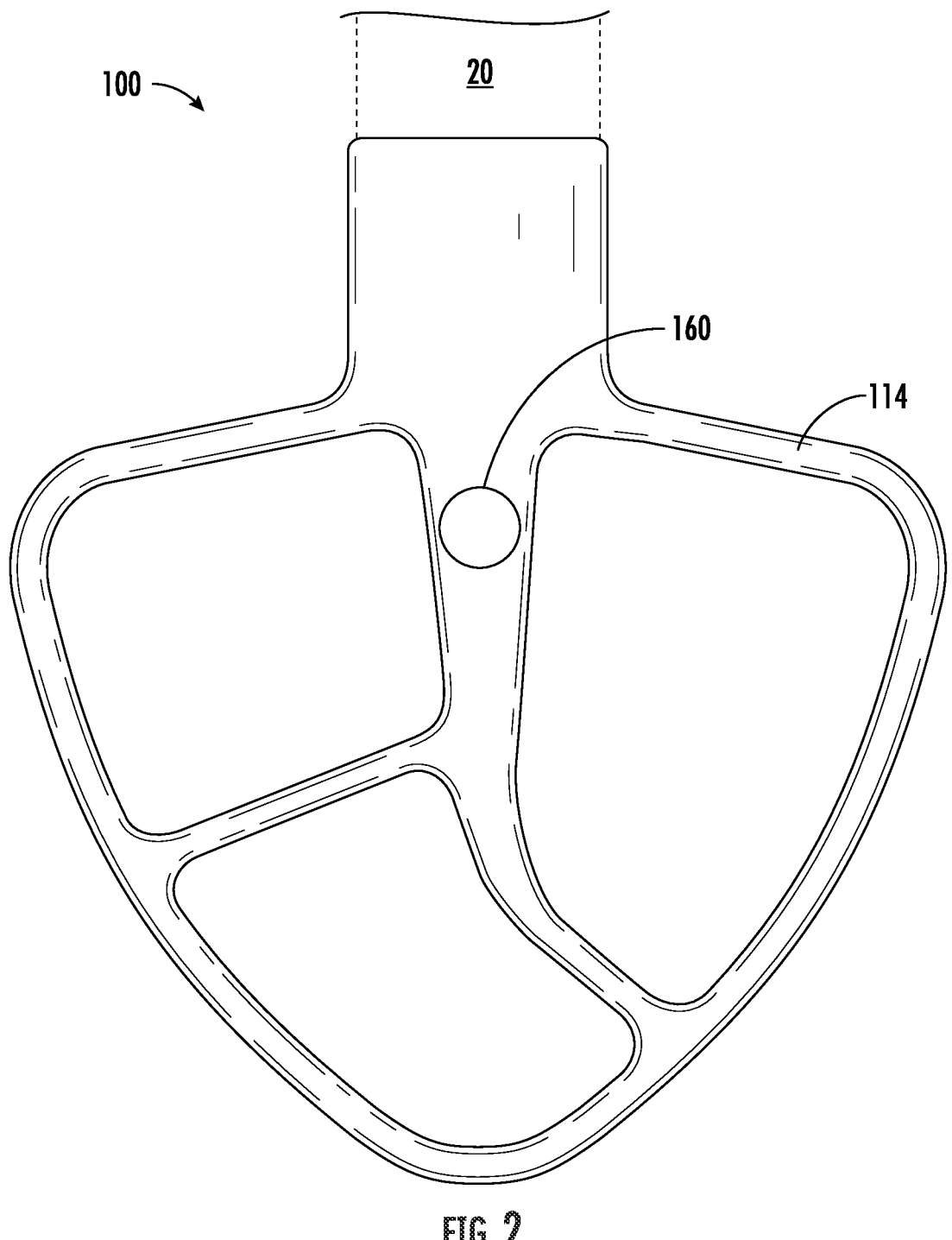
FIG. 2 is side view of an attachment according to an example embodiment of the present subject matter.
Figure 3:
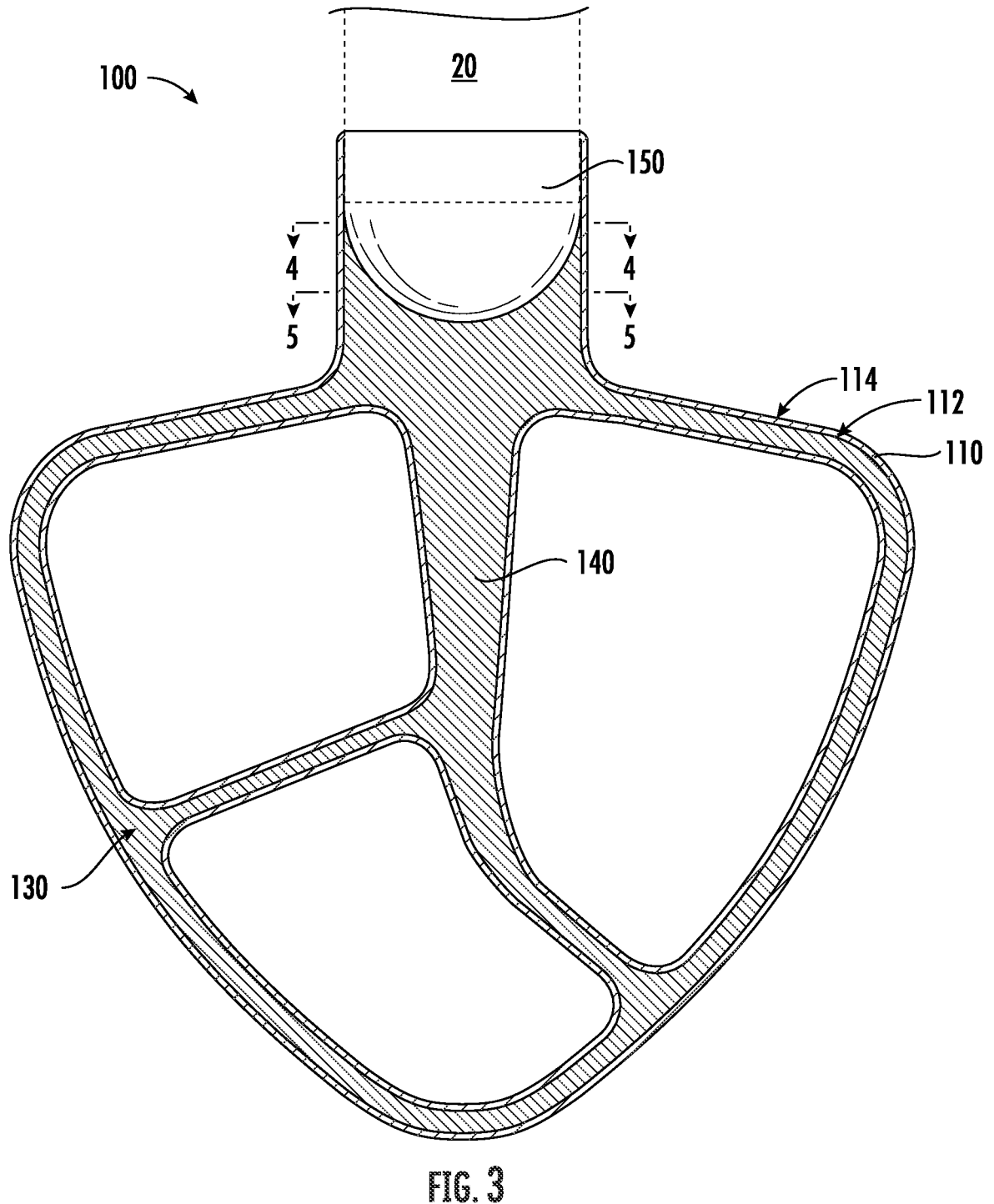
FIG. 3 is a side, cross-section view of the attachment of FIG. 2.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a ten percent (10%) margin.

FIG. 1 provides a side, elevation view of a food processing apparatus 10, in particular a stand mixer, with an attachment 100 and container 200 (i.e., a bowl) according to an example embodiment of the present subject matter. It will be understood that the food processing apparatus 10 is provided by way of example only and that the present subject matter may be used in or with any suitable food processing apparatus in alternative example embodiments. The food processing apparatus 10 includes a food processing apparatus drive shaft 20 that may mechanically engage with the attachment 100 embodiment of the present subject matter. A motor (not shown) within the food processing apparatus 10 may be coupled to the attachment 100 via the drive shaft 20 such that the motor is operable to rotate the attachment 100 within the container 200.

FIGS. 2-5, which show an embodiment of an attachment 100 of the present subject matter, will be discussed in detail below in conjunction with example aspects of the present subject matter. The embodiment of the attachment 100 shown in FIGS. 2-5 is a paddle mixer for a stand mixer. However, it should be understood that the attachment 100 of the present subject matter includes any attachment 100 that comes into contact with the food while being manipulated by any type of food processing apparatus, including stand mixers, food processors, blenders, immersion blenders, slicers, hand mixers, and the like.

The attachment 100 may be mechanically coupled to the drive shaft 20 of the food processing apparatus 10. The attachment 100 includes a wall 110 with an inner surface 112 and an outer surface 114. The inner surface 112 at least partially defines an enclosed space 130. The inner and outer surfaces 112, 114 of the wall 110 of the apparatus may be unitary, and for example, be portions of single structure. However, the inner and outer surfaces 112, 114 of the wall 110 of the attachment 100 may be nonunitary, and for example, be separate substructures joined by sealing or adhesives or joined by additional structural elements to form a unitary structure. In an example embodiment of the present subject matter, the inner surfaces 112 of the wall 110 (and optionally portions of any other sealing elements present) define the enclosed space 130.

A phase change material 140 is disposed within the enclosed space 130. The phase change material 140 may fill all or only a portion of the enclosed space 130. In certain example embodiments, the phase change material 140 may fill no less than eighty percent (80%), no less than ninety percent (90%), no less than ninety-five percent (95%), no less than ninety-nine percent (99%), etc. of the enclosed space 130. The phase change material 140 is in thermal communication with at least a portion of the inner surface 112 of the wall 110 of the attachment 100. In an example embodiment, at least some portion of the outer surface 114 of the wall 110 adjacent to the portion of the inner surface 112 of the wall 110 in thermal contact with the phase change material 140 is in contact with a food being processed by the food processing apparatus 10 while in use.

As used herein, the term "thermal communication" means that a first substance (i.e., the phase change material 140) is positioned such that the first substance can absorb heat from or provide heat to a second substance (i.e., the inner surface 112 of the wall 110). In an example embodiment, a portion of the wall 110 in thermal communication with the phase change material 140 may be formed from a material with a high thermal conductivity. As used herein, the term "material with a high thermal conductivity" means a material that rapidly transfers from one area to another. Suitable materials with sufficiently high thermal conductivity, include metals, such as stainless steel, aluminum, copper, steel, either with or without paint or other protective coating or surface conversion, such as anodizing.

Figure 6:
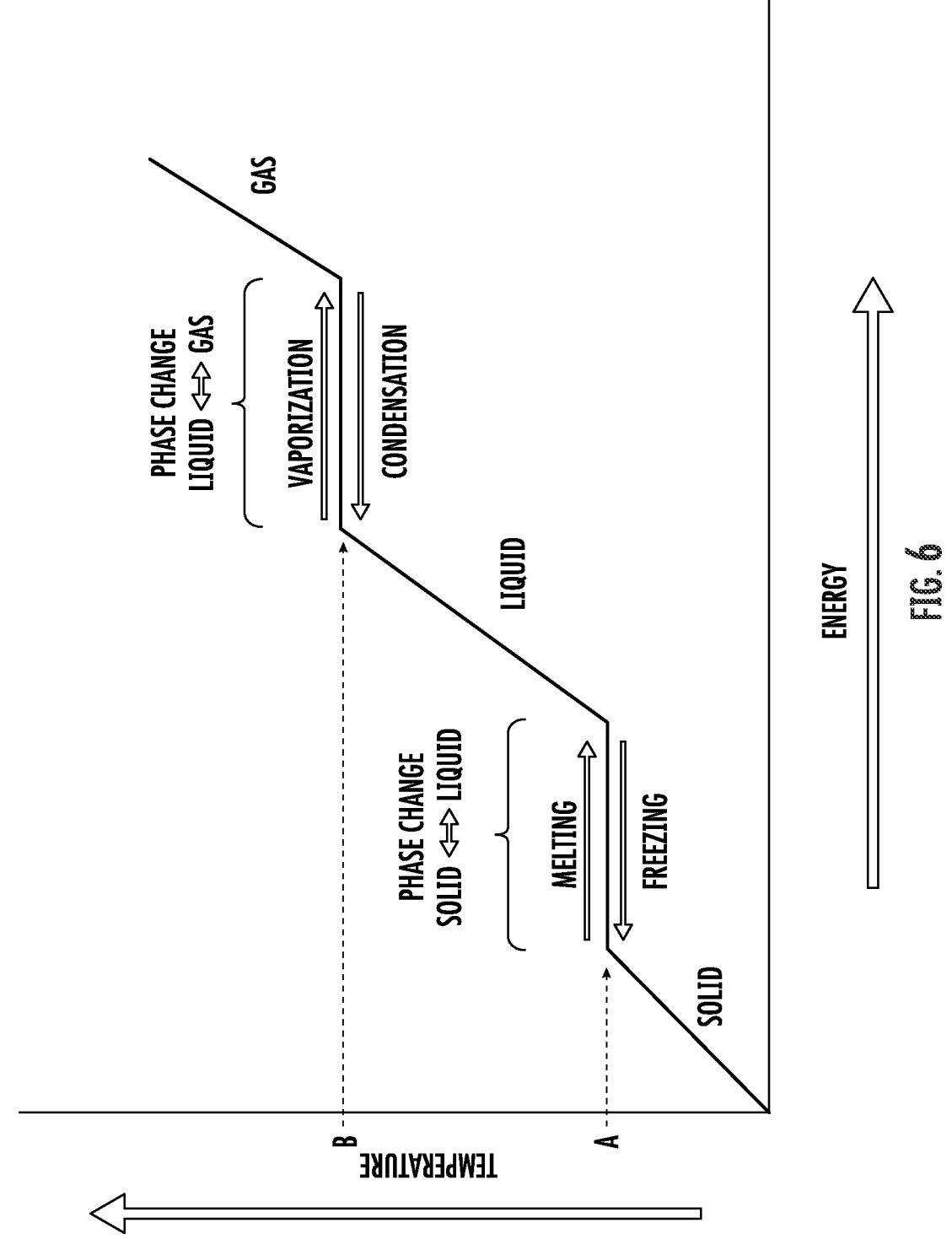
FIG. 6 is a graphical representation of the relationship between energy absorption and temperature change for a phase change material.
Figure 7:
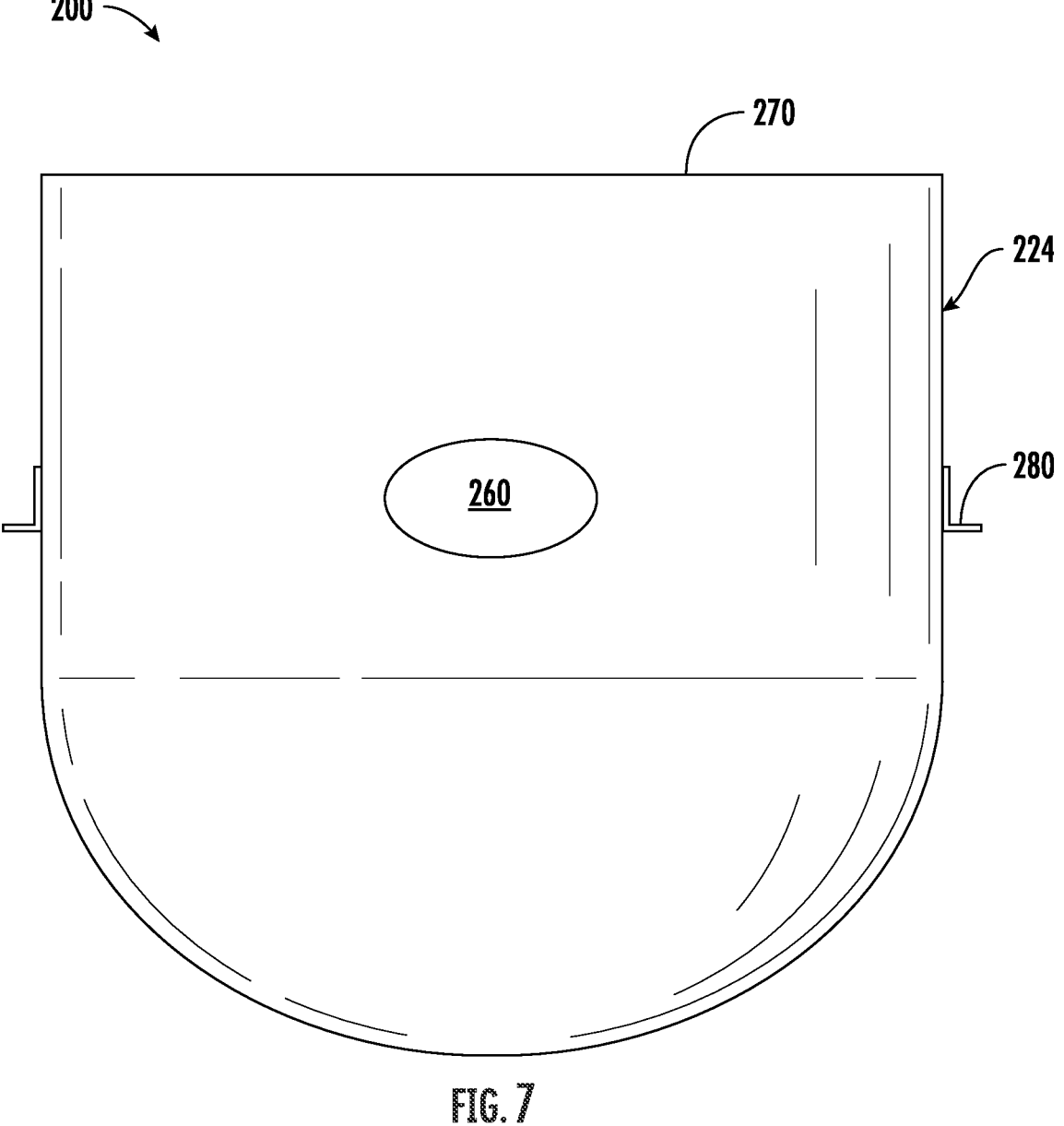
FIG. 7 is side view of a container, i.e., a bowl, according to an example embodiment of the present subject matter.
Figure 8:
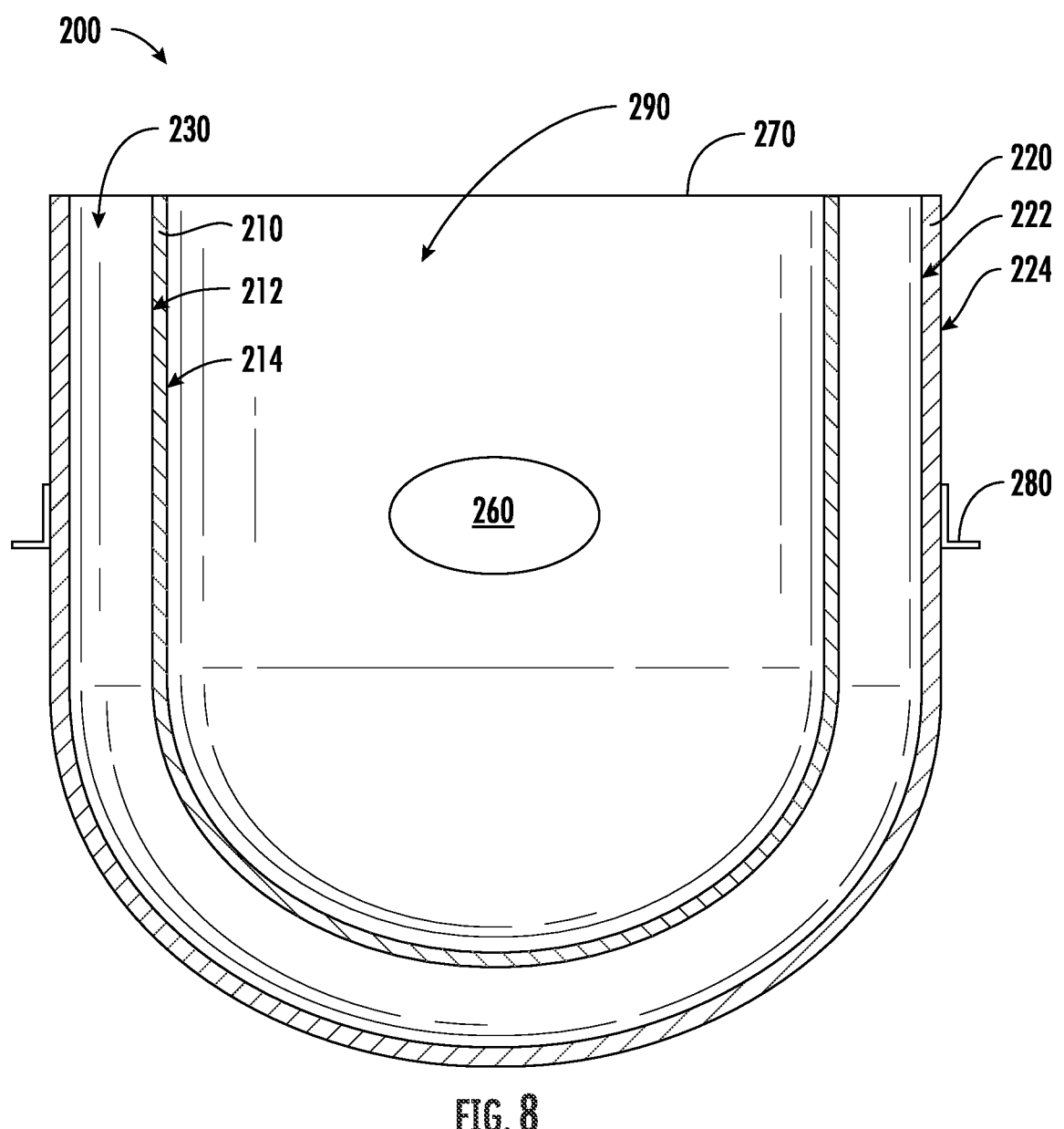
FIG. 8 is a side, cross-section view of the container of FIG. 7, without the phase change material and without the insulating material.
Figure 9:
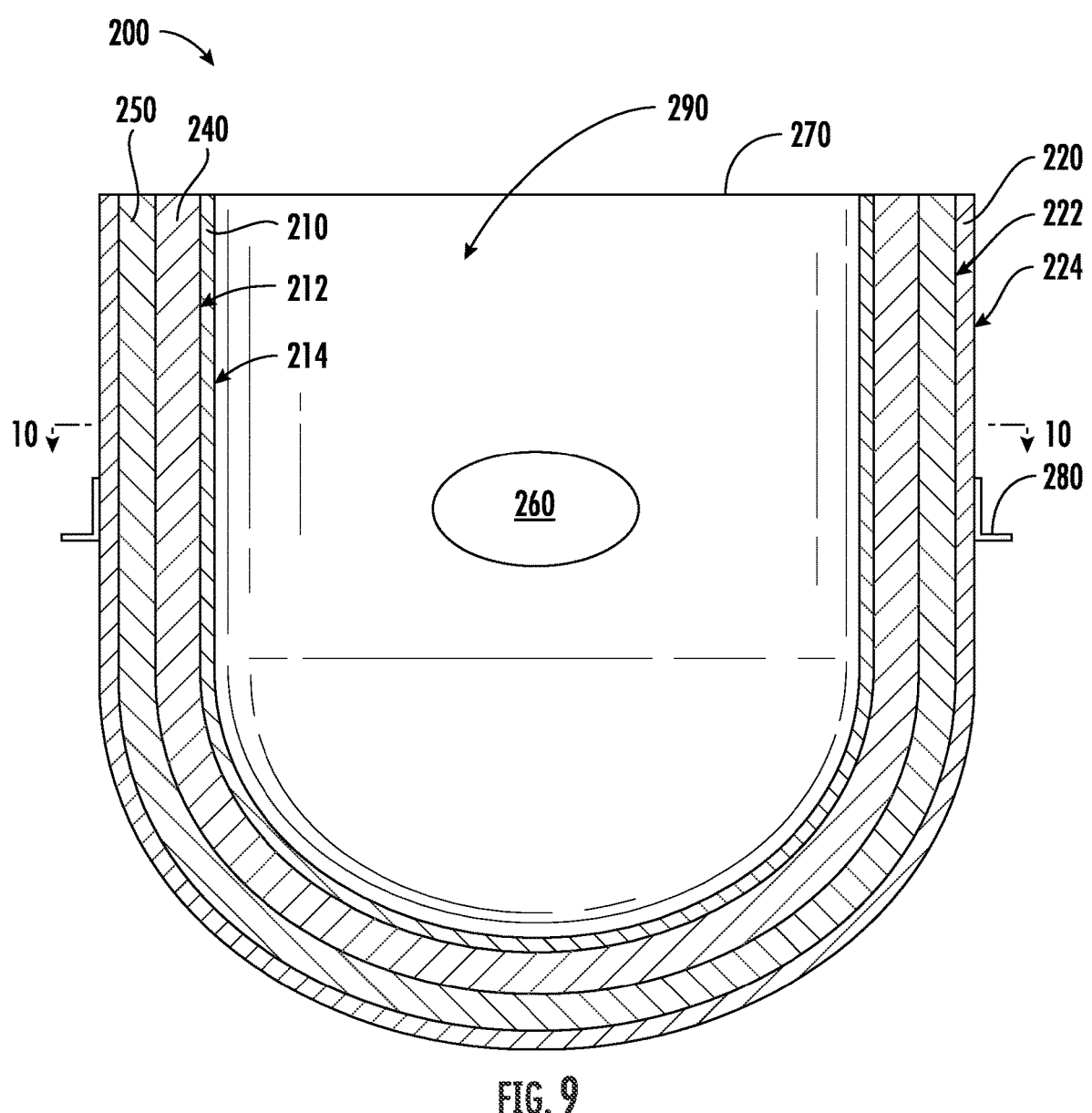
FIG. 9 is a side, cross-section view of the container of FIG. 7.
Figure 10:
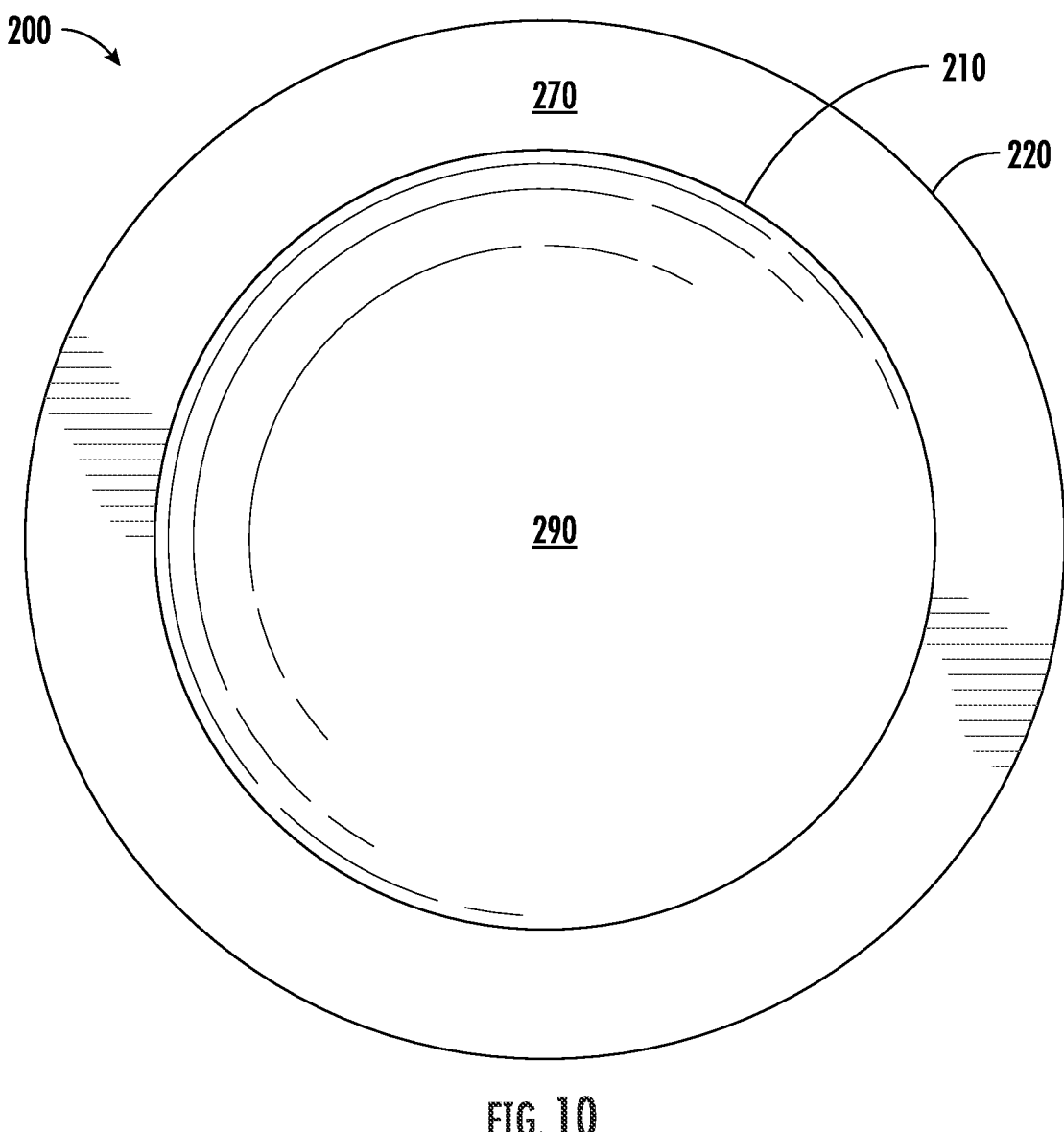
FIG. 10 is a top view and plane 10 of the container of FIG. 7.
Figure 11:
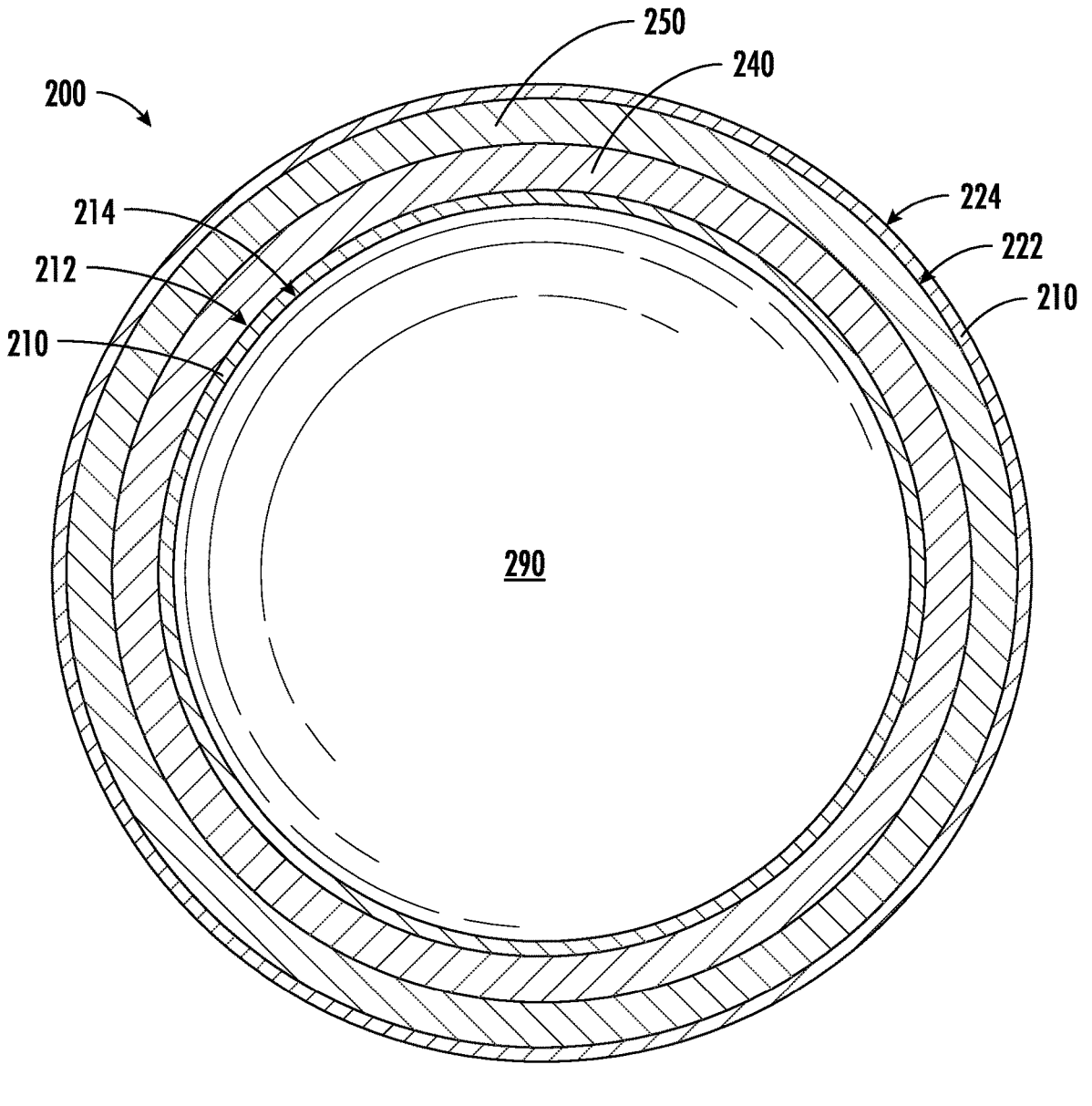
FIG. 11 is a top, cross-section view and plane Z of the container of FIG. 7.

As a solid material is heated, the solid material will eventually change phases from a solid to the liquid (i.e., melt). As this liquid material is further heated, the liquid material will eventually change phases from a liquid to a gas (i.e., vaporize or boil). FIG. 6 graphically represents the temperature change of a material as the material changes phases from a solid to a liquid to a gas as heat (energy) is added (i.e., the heating curve).

As shown in FIG. 6, when a material changes phases, the material absorbs a large amount of heat (i.e., latent heat) but stays at the same temperature (see temperatures A and B). This is because a large amount of energy is needed (or removed) to change the phase of the material from one phase to another and during this change in phases no change in temperature occurs. To again refer to water, as ice melts, a large amount of heat is needed to break the crystal bonds and change the ice to water, but during this entire phase change the ice/water stays level at 0 degrees Celsius (i.e., the melting point of water). A similar temperature plateau occurs when the phase changes from liquid to gas (at the boiling point).

The amount of heat needed to change one gram of a material from a solid to a liquid is defined as the heat of solidification. Note that these values represent both a) the amount of heat absorbed to melt the substance and b) the amount of heat removed/dissipated to solidify the substance.

Whether heat is absorbed or dissipated is determined by the direction of the phase change, i.e., whether the material freezing or melting. Similarly, the amount of heat needed to change one gram of a material from a liquid to a gas is defined as the heat of vaporization. The heats of solidification and vaporization are generally large. Again, referring to water, the heat of solidification is about eighty (80) calories and the heat of vaporization is five hundred and forty (540) calories.

Using the temperature plateaus and the predictability of the melting points for various materials, it is possible to identify substances with high heats of solidification and desired melting points. As used herein, the term "phase change material" means a substance that has a phase change which occurs at a temperature desirable to maintain the temperature food an advantageous level. In an example embodiment, the predetermined temperature is at or near the freezing point of water, such as from about −5° C. to about 5° C. In an example embodiment, the predetermined temperature is cold temperature, such as from about 5° C. to 20° C. In an example embodiment, the predetermined temperature is near-room temperature, such as from about 20° C. to 30° C. In an example embodiment, the predetermined temperature is hot temperature, such as from about 30° C. to 60° C. In an example embodiment, the predetermined temperature is hot temperature, such as from about 30° C. to 60° C. In an exemplary embodiment, the food processing apparatus is a stand mixer used to knead bread. For kneading bread keeping the temperature under about 23° C. during kneading is important to allow the yeast to ferment gradually. However, during kneading with a stand mixer, bread dough can rise in temperature. To prevent this, in an exemplary embodiment the predetermined temperature is about 20° C.

Any material with the desired properties may be used in the present subject matter as the phase change material. Suitable phase change materials include, for example, water, polymers with long chain molecules (such as paraffin waxes, oils, fatty acid, and polyglycols), hydrated salts, alcohol solutions, and Glauber's salt (sodium sulfate).

In an example embodiment, the phase change material 140 may be charged prior to use. As used herein, the term "charged" means that the phase change material 140 must be heated above the melting point or cooled below the melting point of the phase change material prior to use. For example, if the food is to be maintained at a cooled temperature, the attachment 100 may be charged by chilling in a freezer or refrigerator to a temperature below the melting point of the phase change material 140 as may be indicated by the phase change indicator 160. On the other hand, if the food is to be maintain at an elevated temperature, the attachment 100 may be charged by heating in a warm oven or using a hot water bath to a temperature above the melting point of the phase change material 140 as may be indicated by the phase change indicator 160. In another exemplary embodiment, if the food is to be maintained at a near-room temperature, the attachment 100 may be charged by storing at room temperature, and thus cooling, to a temperature below the melting point of the phase change material 140 as may be indicated by the phase change indicator 160. In an example embodiment, the phase change material 140 may be re-charged after use to reset the phase change material 140 and allow the phase change material 140 to be used again. This use and charging cycle may be repeated as needed for subsequent food processing operations.

In an example embodiment, an insulating material 150 may be disposed within the enclosed space 130. The insulating material 140 may fill a portion of the enclosed space

130 and be in thermal communication with at least a portion of the inner surface 112 of the wall 110 of the attachment 100. In an example embodiment, at least some portion of the outer surface 114 of the wall 110 adjacent to the portion of the inner surface 112 of the wall 110 in thermal contact with the insulating material 140 is not in contact with a food being processed by the food processing apparatus while in use and insulates the phase change material 140 from the ambient temperature.

As used herein "an insulating material" is a material that slowly transfers heat from one area to another, i.e., the insulating material is a material with low thermal conductivity. Suitable insulating materials, include a vacuum panel, expanded foam, such as expanded polyethylene or expanded polystyrene (i.e, Styrofoam), glass wool, wood, any low density gas, such as argon. In an example embodiment, a portion of the wall 110 not in contact with the food may be made of a material with low thermal conductivity.

Figure 4:
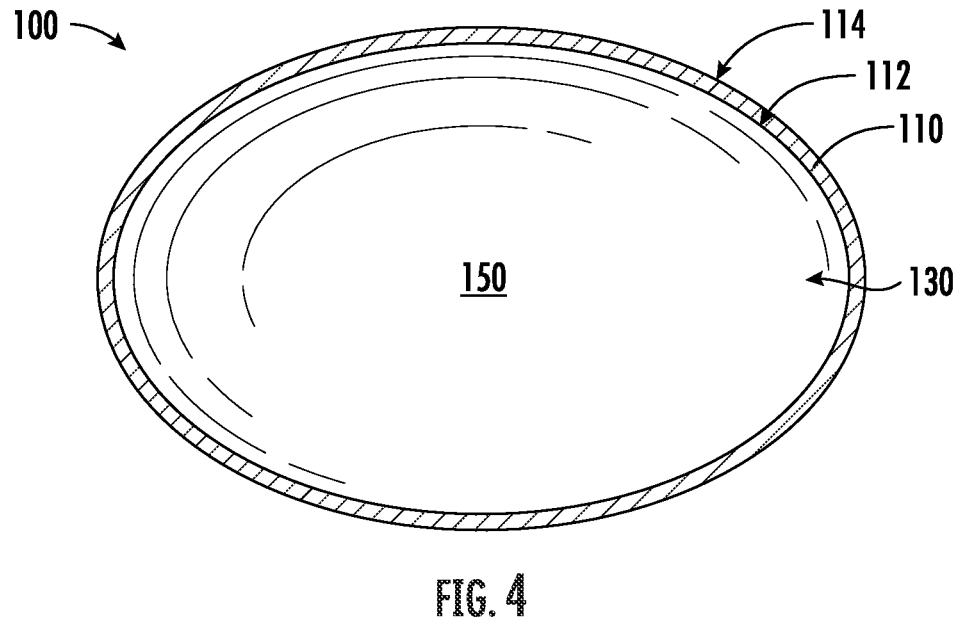
FIG. 4 is a top, cross-section view and plane 4 of the attachment of FIG. 2.
Figure 5:
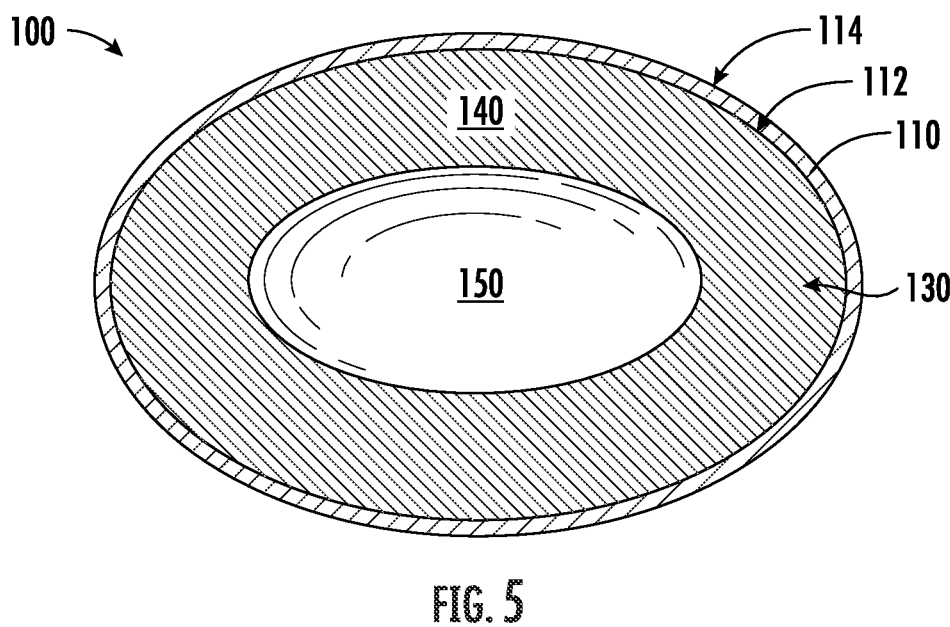
FIG. 5 is a top, cross-section view and plane 5 of the attachment of FIG. 2.

As shown, in FIG. 4, a cross-section of the attachment 100 at plane 4, in an example embodiment, the insulating material 150 contacts a portion of the wall 110 that will not be in contact with the food during operation. This allows the insulating material 150 to provide a thermal barrier (i.e., insulate) the food and phase change material 140 from the heat in the surrounding environment and/or from the drive shaft which can conduct heat from a motor. As shown in FIG. 5, a cross-section of the attachment 100 at plane 5, in an example embodiment, the insulating material 150 contacts the phase change material 140 and the phase change material contacts a portion the wall 110 that may be in contact with the food during operation. Thus, the insulating material 150 acts as a thermal barrier between the phase change material 104 and/or the food and the ambient temperature.

In one example embodiment, the attachment 100 includes a phase change indicator 160. Generally, the phase change indicator 160 is any structure or compound which indicates or any means of indicating that the phase change material 140 is currently capable of maintaining the predetermined temperature. In an example embodiment, the phase change indicator 160 is a thermochromic material that changes color when the temperature of the phase change material 140 is not the predetermined temperature. In an example embodiment, the thermochromic material is adhered a portion of the outer surface 114 of the wall 110 of the attachment 100 adjacent to a portion of the inner surface 112 of the wall that is in thermal communication with the phase change material 140. In an example embodiment, the thermochromic material is a thermochromic-material-containing paint or coating. In another example embodiment, the thermochromic material is admixed with the phase change material 140 and the wall 110 of the attachment 100 includes a transparent portion (i.e., a window) to allow the operator to observe the color of the phase change material 140 in the enclosed space 130. In another example embodiment, the phase change indicator 160 is a transparent portion (i.e., a window) in the wall 110 of the attachment 100 to allow the operator to observe the phase change material 140 in the enclosed space 130, and thus, directly observe the change in phase of the phase change material 140. In an embodiment, the operator may observe the physical state of the phase change material 140, e.g., whether it is a solid or a liquid. In another embodiment, the transparent portion may be placed such that the phase change material 140 is only observable when it is charged, for example, the phase change material 140 may expand in volume upon charging, and thus only reach be seen in the transparent portion when charged. On the other hand, when not charged the volume would be less and the phase change material 140 would not be visible in the transparent portion.

In operation, in an example embodiment, the attachment 100 is mounted onto or otherwise associated with the food processing apparatus 10 and the food is brought into contact with at least a portion of the outer surface 114 of the wall 110 adjacent to the portion of the inner surface 112 of the wall 110 in thermal contact with the phase change material 140 while being manipulated by the food processing apparatus. In this manner, heat may be provided to or removed from the food, as appropriate. The heat is thus transmitted to or removed from the wall 110 of the attachment 100 and therethrough to the phase change material 140 in thermal contact with the wall 110. Thus, the food may be maintained at the predetermined temperature during the manipulation of the food. When an operator observes that the phase change indicator 160 changes color, the operator will then know that the phase change material 140 is no longer at the predetermined temperature and may charge the attachment 100 (as described above) to restore the attachment's 100 ability to maintain food temperature.

FIGS. 7-11, which show an example embodiment of a container 200 of the present subject matter, will be discussed in detail below in conjunction with example aspects of the present subject matter. The example embodiment of the container 200 shown in FIGS. 7-11 is a bowl for use with a stand mixer. However, it should be understood that the container 200 of the present subject matter in includes any container 200 that comes into contact with the food while being manipulated and any type of food processing apparatus 10, including stand mixers, food processors, blenders, immersion blenders, slicers, hand mixers, and the like. Examples of such containers include bowls, blender jars, pasta makers, bread makers, and the like.

The container 200 may be mechanically coupled to the food processing apparatus 10 using the optional container attachment flanges 280. The container 200 includes an inner wall 210 with a first and a second surface opposing surfaces 212, 214 and an outer wall 220 with a first and a second opposing surfaces surface 222, 224. The first surface 212 of inner wall 210 and the first surface 222 of the outer wall 220 at least partially define an enclosed space 230. In an example embodiment, the second surface 214 of inner wall 210 defines a food processing compartment 290, which is adapted to contain the food which is being manipulated by the food processing apparatus 10.

The inner and outer walls 210, 220 of the container 200 may be unitary, and for example, be portions of single structure. However, the inner and outer walls 210, 220 of the container 200 may begin nonunitary, and for example, be separate substructures joined by sealing or adhesives or joined by additional structural elements (such as a top rim 270) to form a unitary structure. In an example embodiment of the present subject matter, the inner and outer walls 210, 220 and the top rim 270 (and optionally portions of any other sealing elements present) define the enclosed space 230.

A phase change material 240 is disposed within the enclosed space 230. The phase change material 240 may fill all or only a portion of the enclosed space 230. The phase change material 240 is in thermal communication with at least a portion of the first surface 212 inner wall 210 of the container 200. In an example embodiment, at least some portion of the second surface 214 of the inner wall 210 adjacent to the portion of the first surface 212 of the inner wall 210 in thermal contact with the phase change material 240 is in contact with a food being processed by the food processing apparatus 10 while in use.

The phase change material 240 and predetermined temperature are the same as discussed above with regard to the attachment 100.

"Thermal communication" and "material with a high thermal conductivity" discussed above with regard to the attachment 100. In an example embodiment, the portion of the inner wall 210 in thermal communication with the phase change material 240 may be formed from a material with a high thermal conductivity. Suitable materials with sufficiently high thermal conductivity, include metals, such as stainless steel, aluminum, copper, steel, either with or without paint or other protective coating or surface conversion, such as anodizing.

In an example embodiment, an insulating material 250 may be disposed within the enclosed space 230. The insulating material 240 may fill a portion of the enclosed space 230 and be in thermal communication with at least a portion of the first surface 222 of the outer wall 220 of the container. In an example embodiment, the insulating material 250 insulates the food and the phase change material 240 from the ambient temperature while the food is being processed by the food processing apparatus 10.

"Insulating material" and "material with low thermal conductivity are discussed above with regard to the attachment 100. Suitable insulating materials, include a vacuum panel, expanded foam, such as expanded polyethylene or expanded polystyrene (i.e, Styrofoam), glass wool, wood, any low density gas, such as argon. In an example embodiment, a portion of the outer wall 220 not in contact with the food may be made of a material with low thermal conductivity.

In one example embodiment, the container 200 includes a phase change indicator 260. Generally, the phase change indicator 260 is any structure or compound which indicates or any means of indicating that the phase change material 240 is currently capable of maintaining the predetermined temperature. In an example embodiment, the phase change indicator 260 is a thermochromic material that changes color when the temperature of the phase change material 240 is not the predetermined temperature. In an example embodiment, the thermochromic material is adhered a portion of the second surface 214 of the inner wall 210 of the container 200. In an example embodiment, the thermochromic material is a thermochromic-material-containing paint or coating. In another embodiment, the thermochromic material is admixed with the phase change material 240 and the inner wall 210 or outer wall 220 of the container 200 includes a transparent portion (i.e., a window) to allow the operator to observe the color of the phase change material 240 in the enclosed space 230. In another example embodiment, the phase change indicator 260 is a transparent portion (i.e., a window) in the inner wall 210 or outer wall 220 of the container 200 to allow the operator to observe the phase change material 240 in the enclosed space 230, and thus, directly observe the change in phase of the phase change material 240. In an embodiment, the operator may observe the physical state of the phase change material 240, e.g., whether it is a solid or a liquid. In another embodiment, the transparent portion may be placed such that the phase change material 240 is only observable when it is charged, for example, the phase change material 240 may expand in volume upon charging, and thus only reach be seen in the transparent portion when charged. On the other hand, when not charged the volume would be less and the phase change material 240 would not be visible in the transparent portion.

In operation, in an example embodiment, the container 200 is mounted onto or otherwise associated with the food processing apparatus 10 and the food placed in the food processing compartment 290, and thus, brought into contact with at least a portion of the second surface 214 of the inner wall 210 while being manipulated by the food processing apparatus. In this manner, heat may be provided to or removed from the food, as appropriate. The heat is thus transmitted to or removed from the inner wall 210 of the container 200 and therethrough to the phase change material 240 in thermal contact with the inner wall 210. Thus, the food may be maintained at the predetermined temperature during the manipulation of the food. When an operator observes that the phase change indicator 260 changes color, the operator will then know that the phase change material 240 is no longer at the predetermined temperature and may charge the container 200 (as described above) to restore the container's 200 ability to maintain food temperature.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An accessory for a food processing apparatus, comprising:

a wall having an inner and outer surface;

an enclosed space at least partially defined by the inner surface of the wall;

a phase change material filling at least a portion of the enclosed space and in thermal communication with at least a portion of the inner surface the wall, wherein the phase change material changes phases at a predetermined temperature; and a phase change indicator that provides an indication whether a temperature of the phase change material or a temperature of the portion of the wall in thermal communication with the phase change material is above or below the predetermined temperature, wherein the phase change indicator is a thermochromatic material and the indication is a color change, and wherein the thermochromatic material is admixed with the phase change material and the wall includes a window disposed therethrough which allows observation of the color change.

2. The accessory of claim 1, wherein the phase change material is selected from the group consisting of water, polymers with long chain molecules, hydrated salts, alcohol solutions, and Glauber's salt.

3. The accessory of claim 1, further comprising an insulating material filling at least another portion of the enclosed space and in thermal communication with at least another portion of the inner surface of the wall.

4. The accessory of claim 1, wherein the thermochromatic material is adhered to the outer surface of the wall.

5. A method of maintaining a predetermined temperature of a food being manipulated by a food processing apparatus while in use comprising:

a) providing an accessory for a food processing apparatus comprising a wall having an inner and outer surface, an enclosed space at least partially defined by the inner surface of the wall, and a phase change material filling at least a portion of the enclosed space and in thermal communication with at least a portion of the inner surface the wall, wherein the wall comprises a transparent portion for observing the phase change material; and b) bringing the food into contact with at least a portion of the outer surface of the wall adjacent to the portion of the inner surface of the wall in thermal contact with the phase change material while being manipulated by the food processing apparatus.

6. The method of claim 5, further comprising c) charging the phase change material prior to bringing the food into contact with the accessory.

7. A container for use with a food processing apparatus, comprising:

an inner wall having a first and a second opposing surfaces;

an outer wall having a first and a second opposing surfaces;

an enclosed space at least partially defined by the first surface of the inner wall and the first surface of the outer wall, and adjacent to the first surfaces of the inner and outer wall;

a phase change material filling at least a portion of the enclosed space and in thermal communication with at least a portion of the first surface of inner wall, wherein the phase change material changes phases at a predetermined temperature;

a phase change indicator that provides an indication whether a temperature of the phase change material or a temperature of the portion of the inner wall in thermal communication with the phase change material is above or below a predetermined temperature at which the phase change material changes phases, wherein the phase change indicator is a thermochromatic material and the indication is a color change, and wherein the thermochromatic material is admixed with the phase change material and the wall includes a window disposed therethrough which allows observation of the color change; and an insulating material filling at least a portion of the enclosed space and in thermal communication with at least a portion of the first surface of outer wall.

8. The container of claim 7, wherein the phase change material is selected from the group consisting of water, polymers with long chain molecules, hydrated salts, alcohol solutions, and Glauber's salt.

9. The container of claim 7, wherein the thermochromatic material is adhered to the second surface of the inner wall.

10. A method of maintaining a predetermined temperature of a food being manipulated by a food processing apparatus while in use comprising:

a) providing a container for use with a food processing apparatus comprising:

an inner wall having a first and a second opposing surfaces, an outer wall having a first and a second opposing surfaces, an enclosed space at least partially defined by the first surface of the inner wall and the first surface of the outer wall, and adjacent to the first surfaces of the inner and outer wall, a phase change material filling at least a portion of the enclosed space and in thermal communication with at least a portion of the first surface of inner wall, wherein one of the inner wall or the outer wall comprises a transparent portion for observing the phase change material, and an insulating material filling at least a portion of the enclosed space and in thermal communication with at least a portion of the first surface of outer wall; and b) bringing the food into contact with at least a portion of the second surface of the inner wall adjacent to the portion of the first surface of the inner wall in thermal contact with the phase change material while being manipulated by the food processing apparatus.

11. The method of claim 10, further comprising c) charging the phase change material prior to bringing the food into contact with the container.

* * * * *